US008120281B2

(12) United States Patent
Reuter

(10) Patent No.: US 8,120,281 B2
(45) Date of Patent: Feb. 21, 2012

(54) LIGHT BEAM CONTROL SYSTEM FOR A SPATIAL LIGHT MODULATOR

(75) Inventor: Fred J. Reuter, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 825 days.

(21) Appl. No.: 11/947,562

(22) Filed: Nov. 29, 2007

(65) Prior Publication Data

US 2009/0140670 A1 Jun. 4, 2009

(51) Int. Cl.
*G05F 1/00* (2006.01)

(52) U.S. Cl. .......................... 315/307; 353/85; 359/237

(58) Field of Classification Search .................. 315/291, 315/307, 312, 383; 353/85, 82; 348/687, 348/744, 750, 758, 759, 771, E13.035, E5.142; 359/237–239, 290, 292

See application file for complete search history.

(56) References Cited

U.S. PATENT DOCUMENTS

| | | | | |
|---|---|---|---|---|
| 6,707,596 | B2 * | 3/2004 | Tomiya | 348/687 |
| 6,733,137 | B2 * | 5/2004 | Tomiya | 348/771 |
| 7,111,962 | B2 * | 9/2006 | Meguro et al. | 362/294 |
| 2005/0237493 | A1 * | 10/2005 | Tajiri | 353/85 |
| 2006/0192924 | A1 * | 8/2006 | Seki et al. | 353/85 |
| 2006/0274286 | A1 * | 12/2006 | Morejon et al. | 353/85 |
| 2007/0278963 | A1 * | 12/2007 | Wu et al. | 315/149 |

* cited by examiner

*Primary Examiner* — Jacob Y Choi
*Assistant Examiner* — Ephrem Alemu
(74) *Attorney, Agent, or Firm* — Warren L. Franz; Wade J. Brady, III; Frederick J. Telecky, Jr.

(57) ABSTRACT

According to one embodiment of the disclosure, a light beam control system includes a positive intrinsic negative diode coupled to a controller circuit. The positive intrinsic negative diode receives a portion of a light beam generated by a light source and converts the portion into a measured intensity. The controller circuit receives the measured intensity, determines an output signal according to the measured intensity and a reference, and adjusts the light beam according to the output signal.

25 Claims, 3 Drawing Sheets

LIGHT BEAM CONTROL SYSTEM FOR A SPATIAL LIGHT MODULATOR

TECHNICAL FIELD OF THE DISCLOSURE

This disclosure generally relates to control systems, and more particularly to a light beam control system for a spatial light modulator and a method of operating the same.

BACKGROUND OF THE DISCLOSURE

Spatial light modulators may be used to modulate a light beam into an image. These spatial light modulators may have a number of spatially oriented refractive or reflective elements that are arranged in a two-dimensional configuration. Examples of such light modulators may include liquid crystal display modulators or digital micro-mirror devices (DMDs).

SUMMARY OF THE DISCLOSURE

According to one embodiment of the disclosure, a light beam control system includes a positive intrinsic negative diode coupled to a controller circuit. The positive intrinsic negative diode receives a portion of a light beam generated by a light source and converts the portion into a measured intensity. The controller circuit receives the measured intensity, determines an output signal according to the measured intensity and a reference, and adjusts the light beam according to the output signal.

Some embodiments of the invention provide technical advantages. For example, according to one embodiment, the light beam control system regulates the light beams generated by light sources. The light beam control system may, therefore, control light sources, such as light emitting diodes or lasers, that do not have a consistent intensity.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

A spatial light modulator may modulate a light beam generated by any suitable light source. Examples of such light sources may include light emitting diodes (LEDs) and laser diodes. These light sources may comprise solid-state components. Solid-state components, however, may have characteristics that vary widely due to, for example, changes in operating temperature. These light sources may produce light beams that vary in intensity, which may limit the quality of images produced by spatial light modulators.

Figure 1:
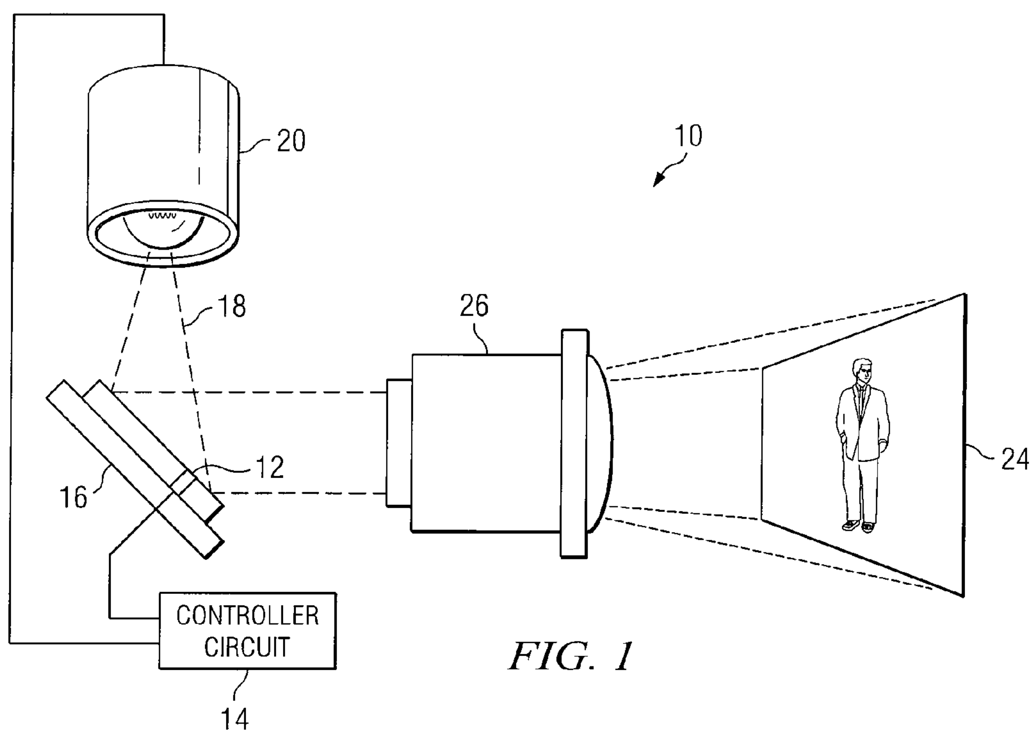
FIG. 1 is a diagram showing one embodiment of a light beam control system according to the teachings of the present disclosure.

FIG. 1 shows one embodiment of a light beam control system 10. Light beam control system 10 includes a positive intrinsic negative (pin) diode 12, a controller circuit 14, a spatial light modulator 16, a light source 20, and a projecting lens 26 electrically, mechanically, and/or optically coupled as shown. In one embodiment of operation, positive intrinsic negative diode 12 receives a portion of light beam 18 generated by light source 20 and generates a signal indicative of the intensity of light beam 18. Controller circuit 14 regulates an amount of light modulated by spatial light modulator 16 by adjusting light beam 18 according to a measured intensity received from positive intrinsic negative diode 12.

Light source 20 generates a light beam 18. Examples of light sources 20 include light emitting diodes or laser diodes, which typically do not generate light beams of consistent intensity. Other examples of light beams 20 include incandescent lamps, sodium vapor lamps, metal halide lamps, xenon lights, high-pressure mercury lamps, fluorescent lamps, and tungsten-halogen lamps.

The spatial light modulator 16 reflects or refracts selected portions of light beam 18. In one embodiment, spatial light modulator 16 may have a plurality of reflective elements corresponding to the arrangement and quantity of pixels to be displayed in image 24. Spatial light modulator 16 may be a digital micro-mirror device (DMD). The digital multi-mirror device has a plurality of reflective surfaces arranged in an M×N configuration that are adapted to selectively reflect light from light source 20 to or away from projecting lens 26. When coordinated together, the reflective surfaces modulate light beam 18 to form image 24. Image 24 may include a plurality of pixels arranged in a N number of rows by a M number of columns, thereby forming the image having height equal to M*(pixel size) and a width equal to N*(pixel size).

Spatial light modulator 16 may have digital circuitry, such as an onboard processing circuit, that manages functions of spatial light modulator 16. For example, the digital circuitry may regulate light beam 18. Other examples of spatial light modulators include liquid crystal display modulators.

In one embodiment, positive intrinsic negative diode 12 may be integrally formed with spatial light modulator 16 on a common substrate. That is, positive intrinsic negative diode 12 may be formed on the same surface of a substrate in which spatial light modulator 16 is formed. When light beam 18 is directed to spatial light modulator 16, positive intrinsic negative diode 12 receives a portion of light beam 18 and converts the portion into a measured signal indicative of the intensity of light beam 18.

Controller circuit 14 controls light beam 18 using positive intrinsic negative diode 12. Controller circuit 14 receives an intensity signal from the light beam 18 and adjusts light beam 18 so that light beam 18 may have a relatively consistent intensity. Controller circuit 14 is described in more detail with reference to FIG. 2.

Figure 2:
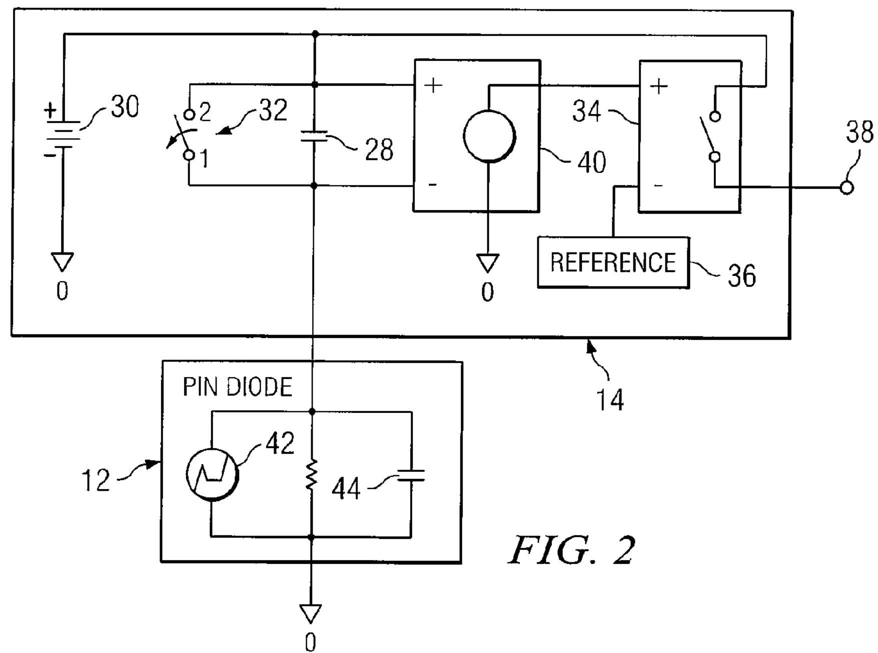
FIG. 2 is a schematic diagram of one embodiment of the controller circuit and positive intrinsic negative diode of FIG. 1.

FIG. 2 shows one embodiment of a controller circuit 14 that may be used to regulate the amount of light modulated by spatial light modulator 16. Controller circuit 14 includes a capacitor 28, a constant voltage source 30, a reset switch 32, a comparator 34, a reference 36, and a buffer 40 electrically, mechanically, and/or optically coupled as shown.

In this particular embodiment, controller circuit 14 includes an integrator circuit. Capacitor 28 is coupled between positive intrinsic negative diode 12 and constant voltage source 30. Capacitor 28 may operate in conjunction with the positive intrinsic negative diode 12 to integrate current through positive intrinsic negative diode 12 over a period of time. When reset switch 32 is opened, voltage increases across capacitor 28 proportional to the instantaneous intensity of the light beam 18. The voltage across capacitor 28 represents an amount of light directed to spatial light modulator 16 and indicates a time averaged intensity of light beam 18. Although the present embodiment describes an integrator circuit implemented with capacitor 28, any suitable type of circuit or integrator circuit may be implemented with positive intrinsic negative diode 12.

Reference 36 may be any suitable device that provides a reference signal that indicates a desired time averaged intensity of light beam 18. In one embodiment, reference 36 includes a digital-to-analog converter (DAC) circuit that converts a digital signal into an analog voltage. The digital-to-analog converter circuit may receive digital signals from digital circuitry of spatial light modulator 16 may regulate light beam 18.

Comparator 34 compares the voltage across capacitor 28 with a reference signal provided by reference 36. Comparator 34 has an output 38 that switches according to comparison of the reference signal with the voltage across capacitor 28. Output 38 may be active for a period of time that extends from opening of reset switch 32 to when the voltage across capacitor 28 exceeds the reference signal from reference 36.

Buffer 40 isolates the input impedance of comparator 34 from capacitor 28. Buffer 40 may not be needed if the input impedance of comparator 34 is sufficiently high.

Positive intrinsic negative diode 12 may include a high frequency biasing source 42 and a parasitic capacitance modeled by parasitic capacitor 44. High frequency biasing source 42 causes positive intrinsic negative diode 12 to have a resistance that varies according the light intensity of light beam 18. Parasitic capacitor 44 may be an inherent consequence caused by the junctions of the positive, intrinsic, and negative portions of positive intrinsic negative diode 12.

Modifications, additions, or omissions may be made to light beam control system 10 without departing from the scope of the invention. The components of light beam control system 10 may be integrated or separated. For example, positive intrinsic negative diode 12 and spatial light modulator 16 may be integrally formed on the same surface of a substrate, or may be formed on a different surface or substrate. Moreover, the operations of light beam control system 10 may be performed by more, fewer, or other components. For example, controller circuit 14 may include buffer 40 that buffers the input of comparator 34 from capacitor 28, or comparator 34 may be directly coupled to the terminals of capacitor 28. Additionally, operations of controller circuit 14 may be performed using any suitable logic comprising software, hardware, and/or other logic. As used in this document, "each" refers to each member of a set or each member of a subset of a set.

Figure 3A:
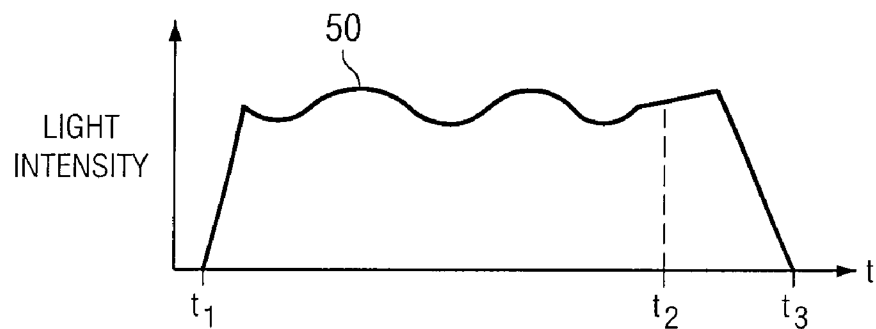
FIGS. 3A through 3C are graphs showing examples of operating characteristics of light beam control system 10.
Figure 3B:
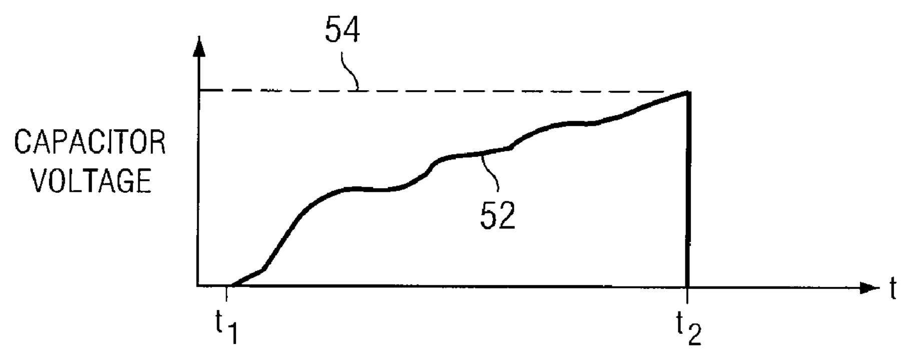
Figure 3C:
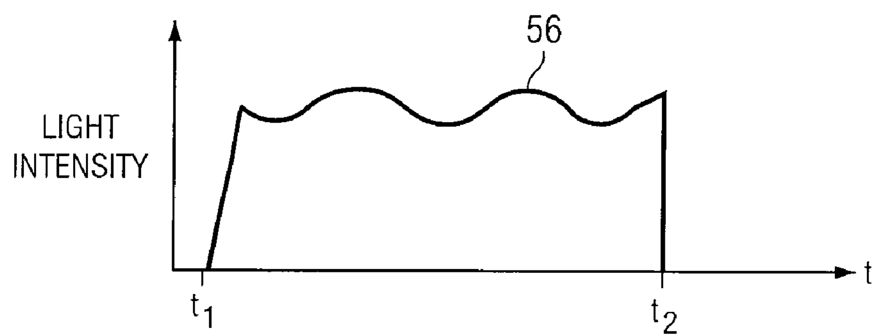

FIGS. 3A through 3C are graphs showing examples of operating characteristics of light beam control system 10.

FIG. 3A shows an unregulated light intensity plot 50 depicting an intensity of light beam 18 incident upon spatial light modulator 16 from time $t_1$ to time $t_3$. Capacitor 28 integrates the light intensity from time $t_1$ to time $t_2$ to regulate the total amount of light modulated by spatial light modulator 16, as shown by the varying the instantaneous light intensity.

FIG. 3B shows a capacitor voltage plot 52 depicting the voltage that develops across the capacitor 28 when reset switch 32 is opened at time $t_1$. The capacitor voltage plot 52 has a positive slope proportional to the light intensity detected by positive intrinsic negative diode 12.

A reference voltage plot 54 shows the voltage level of reference 36. In this case, reference 36 remains at a relatively constant level. As time progresses from time $t_1$ to time $t_2$, the capacitor voltage shown by capacitor voltage plot 52 continually increases until it exceeds the reference voltage. At time $t_2$, comparator 34 switches state in which output 38 of comparator 34 becomes inactive and light beam 18 is prevented from illuminating image 24. Output 38 may prevent illumination using any suitable approach. In one embodiment, output 38 may instruct the elements of spatial light modulator 16 to turn off. In another embodiment, power to light source 20 may be turned off.

FIG. 3C shows a regulated light beam plot 56 depicting the relative intensity of light beam 18 used to generate image 24. The time between time $t_1$ and time $t_2$ may be referred to as an illumination window. Image 24 may be illuminated during a number of these illumination windows to form a continuous image 24.

Figure 4:
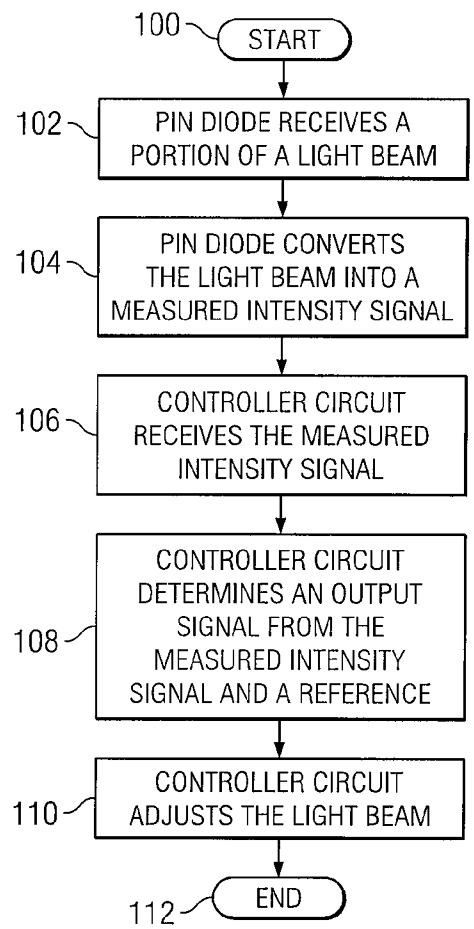
FIG. 4 is one embodiment of a flowchart showing one embodiment of a series of actions that may be performed by the light beam control system of FIG. 1.

FIG. 4 is a flowchart showing a series of actions that may be performed by light beam control system 10 to regulate light beam 18. In act 100, the process is initiated.

In act 102, positive intrinsic negative diode 12 receives a portion of light beam 18 modulated by spatial light modulator 16. In one embodiment, positive intrinsic negative diode 12 and spatial light modulator 16 may be formed on the same surface of a substrate such that positive intrinsic negative diode 12 may intercept a portion of light beam 18 directed onto spatial light modulator 16.

In act 104, positive intrinsic negative diode 12 converts the portion of light beam 18 into a measured intensity signal. The measured intensity signal may indicate the instantaneous intensity of light beam 18. In act 106, controller circuit 14 receives the measured intensity signal from positive intrinsic negative diode 12. In one embodiment, controller circuit 14 receives the measured intensity signal as a current level that varies according to the light intensity of light beam 18.

In act 108, controller circuit 14 determines an output signal according to the measured intensity signal and a reference signal from reference 36. In one embodiment, the reference signal is indicative of a desired time averaged intensity of light beam 18. Controller circuit 14 may determine the output signal by comparing the time averaged intensity of light beam 18 with reference 36.

In act 110, controller circuit 14 adjusts light beam 18 according to the output signal. In the example, if the time averaged intensity of the measured intensity signal is less than that indicated by the reference signal, controller circuit 14 may adjust light beam 18 to increase the time averaged intensity of light beam 18. Conversely, if the time averaged intensity of the measured intensity signal is greater than that indicated by the reference signal, controller circuit 14 may adjust light beam 18 to decrease the time averaged intensity of light beam 18.

In one embodiment, controller circuit 14 adjusts light beam 18 by decreasing the amount of time light beam 18 illuminates image 24. For example, controller circuit 14 may turn off the elements of the spatial light modulator 16 or turn off light source 20. In another embodiment, controller circuit 14 adjusts light beam 18 by adjusting the instantaneous intensity of light beam 18. The instantaneous intensity of light source 20 may be adjusted by proportionally adjusting power to light source 20.

The previously described process continues throughout operation of light beam control system 10. When control of light beam 18 is no longer needed or desired the process may be halted in act 112.

Modifications, additions, or omissions may be made to the method without departing from the scope of the invention. The method may include more, fewer, or other acts. For example, digital circuitry of spatial light modulator 16 may adjust the reference signal provided to comparator 34 to adjust the overall intensity of image 24.

Figure 5:
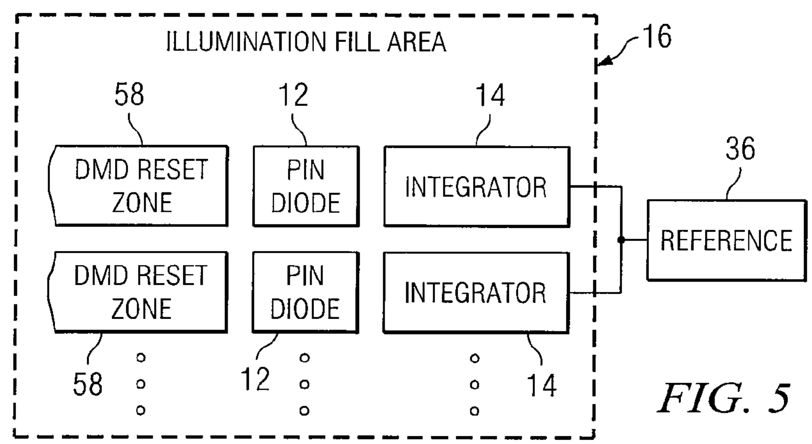
FIG. 5 is a partial, plan view of one embodiment of a spatial light modulator having a number of reset zones, in which the light beam of each reset zone is regulated by a positive intrinsic negative diode and its associated controller circuit.

FIG. 5 shows an alternative configuration in which spatial light modulator 16 comprises a number of reset zones 58. As described above, spatial light modulator 16 may have a number of refractive or reflective elements that modulate light beam 18 into image 24. Each reset zone 58 generally includes a subset of these refractive or reflective elements.

In one embodiment, a positive intrinsic negative diode 12 and an associated controller circuit 14 may be provided for each of the reset zones 58. Certain embodiments incorporating a controller circuit 14 and associated positive intrinsic negative diode 12 for each reset zone 58 may provide enhanced control of the image's brightness by individually regulating light beam 18 modulated by each reset zone 58 of spatial light modulator 16.

In the particular embodiment shown, reference 36 provides a common signal to multiple controller circuits 14. In other embodiments, one or more controller circuits 14 may receive reference signals from dedicated references 36. In this manner, intensity of light beam 18 may be individually controlled from each reset zone 58.

Although the present invention has been described with several embodiments, a myriad of changes, variations, alterations, transformations, and modifications may be suggested to one skilled in the art, and it is intended that the present invention encompass such changes, variations, alterations, transformation, and modifications as they fall within the scope of the appended claims.

What is claimed is:

1. A light beam control system, comprising:

a spatial light modulator comprising an array of individually addressable light modulating elements for modulating a light beam received from a light source; a plurality of reset zones of the array being defined by respective different subset pluralities of the light modulating elements;

a positive intrinsic negative (PIN) diode associated with each reset zone for generating a measurement signal indicative of an intensity of the light beam incident on the subset plurality of the light modulating elements associated with that reset zone; and a controller circuit associated with each PIN diode and responsive to a determination of a comparison of the measurement signal generated by the associated PIN diode with a reference for generating a control signal for regulating the light intensity of the light beam incident on the subset plurality of the light modulating elements associated with the corresponding reset zone.

2. The system of claim 1, wherein the controller circuit includes a reset switch, and a capacitor configured to be charged by the measurement signal to provide a voltage representative of the intensity averaged over a time period between resets of the reset switch.

3. The system of claim 1, wherein the controller circuit comprises a comparator that provides an output signal having a first state when a voltage representative of the intensity is below a threshold set by the reference and a second state when the voltage is above the threshold.

4. The system of claim 1, wherein the measurement signal is a signal proportional to an instantaneous intensity of the light beam; and the controller circuit includes an integrator for averaging the measurement signal over a time period.

5. The system of claim 4, wherein the controller circuit comprises a comparator for comparing a voltage representative of the intensity averaged over the time period with a reference voltage.

6. The system of claim 5, wherein the controller circuit is configured to provide an output signal that has a first state when the representative voltage is below a threshold set by the reference voltage and a second state when the representative voltage is above the threshold set by the reference voltage.

7. The system of claim 1, wherein the spatial light modulator comprises a two dimensional array of micro-mirrors.

8. The system of claim 7, wherein the PIN diode is formed on a common substrate with the spatial light modulator.

9. The system of claim 8, wherein the controller circuit includes a reset switch, and a capacitor configured to be charged by the measurement signal to provide a voltage representative of the intensity averaged over a time period between resets of the reset switch.

10. The system of claim 9, wherein the measurement signal is a current signal proportional to an instantaneous intensity of the light beam.

11. The system of claim 10, wherein the controller circuit comprises a comparator for comparing the voltage representative of the intensity averaged over the time period with a reference voltage.

12. The system of claim 11, wherein the controller circuit is configured to provide an output signal that has a first state when the capacitor voltage is below a threshold set by the reference voltage and a second state when the capacitor voltage is above the threshold set by the reference voltage.

13. The system of claim 12, wherein the reference voltage is defined by a digital signal from circuitry of the spatial light modulator.

14. A light beam control system, comprising:

a light source for generating a light beam;

a spatial light modulator comprising an array of individually addressable micro-mirrors for modulating the light beam received from the light source; a plurality of reset zones of the array being defined by respective different subset pluralities of the micro-mirrors;

a positive intrinsic negative (PIN) diode associated with each reset zone for generating a measurement signal indicative of an intensity of the light beam incident on the subset plurality of the micro-mirrors associated with that reset zone; and a controller circuit associated with each PIN diode and responsive to a determination of a comparison of the measurement signal generated by the associated PIN diode with a reference for generating a control signal for controlling the light source to regulate the light intensity of the light beam incident on the subset plurality of the micro-mirrors associated with the corresponding reset zone.

15. The system of claim 14, wherein the measurement signal is a current signal proportional to an instantaneous intensity of the light beam; and the controller circuit includes a reset switch, a capacitor configured to be charged by the measurement signal to provide a voltage representative of the intensity averaged over a time period between resets of the reset switch, and a comparator for comparing the voltage representative of the intensity averaged over the time period with a reference voltage and providing an output signal to control the intensity of the light beam from the light source.

16. The system of claim 15, wherein the controller circuit is configured to provide the output signal having a first state when the capacitor voltage is below a threshold set by the reference voltage and having a second state when the capacitor voltage is above the threshold set by the reference voltage.

17. The system of claim 16, wherein the reference voltage is defined by a digital signal from circuitry of the spatial light modulator.

18. A method for controlling a light beam, comprising:

generating a light beam from a light source;

modulating the light beam using a spatial light modulator comprising an array of individually addressable light modulating elements; a plurality of reset zones of the array being defined by respective different subset pluralities of the light modulating elements;

for each reset zone, using a positive intrinsic negative (PIN) diode associated with that reset zone, generating a measurement signal indicative of an intensity of the light beam incident on the subset plurality of the light modulating elements associated with that reset zone; and for each reset zone, responsive to a determination of a comparison of the measurement signal generated by the associated PIN diode for that reset zone with a reference, generating a control signal and controlling the light source with that control signal to regulate the light intensity of the light beam incident on the subset plurality of the light modulating elements associated with that reset zone.

19. The method of claim 18, wherein generating the measurement signal comprises generating a current proportional to the intensity of the light beam incident on the subset plurality of the light modulating elements associated with that reset zone.

20. The method of claim 19, wherein generating the control signal comprises generating a voltage representative of an instantaneous intensity averaged over a time period.

21. The method of claim 20, wherein the voltage is generated by a capacitor which is charged by the current, and wherein the time period is set by operation of a reset switch.

22. The method of claim 20, wherein generating the control signal comprises comparing the voltage representative of the instantaneous intensity averaged over the time period with a threshold set by a reference voltage.

23. The method of claim 22, wherein generating the control signal further comprises generating the control signal having a first state when the representative voltage is below the threshold and having a second state when the representative voltage is above the threshold.

24. The method of claim 23, wherein the reference voltage is defined by a digital signal derived from circuitry of the spatial light modulator.

25. The method of claim 24, wherein the light source comprises a light emitting diode or a laser diode; and the light modulating elements comprise micro-mirrors.

* * * * *